United States Patent [19]

Wu et al.

[11] Patent Number: 4,629,747

[45] Date of Patent: Dec. 16, 1986

[54] MICROBIOCIDAL ANIONIC SEQUESTERANTS WITH POLYVALENT METAL CATIONS FOR PERMEABILITY CORRECTION PROCESS

[75] Inventors: Yulin Wu; Naim A. Mumallah, both of Bartlesville, Okla.

[73] Assignee: Phillips Petroleum Company, Bartlesville, Okla.

[21] Appl. No.: 753,097

[22] Filed: Jul. 9, 1985

Related U.S. Application Data

[62] Division of Ser. No. 629,153, Feb. 9, 1984, Pat. No. 4,552,217.

[51] Int. Cl.$^4$ .............................................. C08K 5/09
[52] U.S. Cl. .................................. 523/130; 524/395; 524/398; 524/399
[58] Field of Search .................. 524/395, 398, 399; 523/130

[56] References Cited

U.S. PATENT DOCUMENTS

| | | | |
|---|---|---|---|
| 3,056,757 | 10/1962 | Rakowitz | 523/130 |
| 3,265,657 | 8/1966 | Sinclair | 524/398 |
| 3,554,287 | 1/1971 | Eilers | 524/399 |
| 3,762,476 | 10/1973 | Gall . | |
| 3,952,806 | 4/1976 | Trantham . | |
| 3,981,363 | 9/1976 | Gall . | |
| 4,014,831 | 3/1977 | Bock | 524/399 |
| 4,018,286 | 4/1977 | Gall et al. . | |
| 4,032,496 | 6/1977 | Spencer | 524/395 |
| 4,039,029 | 8/1977 | Gall . | |
| 4,367,297 | 1/1983 | Hubner | 523/130 |

FOREIGN PATENT DOCUMENTS 2055106  2/1981  United Kingdom .

*Primary Examiner*—Paul R. Michl
*Attorney, Agent, or Firm*—J. E. Phillips

[57] ABSTRACT

A water permeability correction process, and composition therefor, to improve the sweep efficiency of waterflooding which involves the sequential injection of (1) an optional aqueous preflush slug to adjust connate water salinity, (2) an aqueous sequestered polyvalent metal cation, such as chromium, wherein the sequestering anion is bactericidal, such as propionate, (3) a gelable polymeric viscosifier, such as polyacrylamide, and, preferably, (4) an aqueous drive fluid.

2 Claims, No Drawings

MICROBIOCIDAL ANIONIC SEQUESTERANTS WITH POLYVALENT METAL CATIONS FOR PERMEABILITY CORRECTION PROCESS

This is a Divisional Application of Ser. No. 629,153 filed July 9, 1984, now U.S. Pat. No. 4,552,217.

FIELD OF THE INVENTION

The invention pertains to methods for correcting the water permeability contrast for heterogeneous subterranean formations. In one aspect, the invention pertains to prolonged permeability contrast correction of underground strata. In a particular aspect, the invention pertains to gelable aqueous polymer solutions employing components which are biocidal, particularly important in treatments wherein formation waters containing sulfate reducing bacteria are encountered. In a further aspect, the invention pertains to methods of waterflooding.

BACKGROUND OF THE INVENTION

In older oil-producing fields, water channeling through the high permeability zones in an oil reservoir will by-pass a large amount of oil-in-place. The more permeable zones of the subterranean formation tend to take most of the injected fluids. While initially this is acceptable in sweeping oil from such zones of relatively high permeability, it subsequently becomes undesirable as the oil content of such strata becomes depleted since much of the subsequently injected floodwater or other fluid by-passes the relatively less permeable zones and provides little benefit in enhancing further hydrocarbon recoveries.

Indepth plugging of a relatively high-permeability zone is to be preferred, so as to convert the zone into a much lower permeability zone. Then, subsequently injected floodwater will tend to enter the previously by-passed but now relatively more permeable hydrocarbon bearing zones and thus mobilize increased amounts of hydrocarbons therefrom.

A variety of means of subterranean formation permeability corrections have been developed. U.S. Pat. No. 3,762,476 (Gall, Oct. 2, 1973) describes the use of a variety of polymers in conjunction with crosslinking solutions of various multivalent metal cations complexed with certain sequestering/retarding anions selected from the recited group consisting of acetate, nitrilotriacetate, tartrate, citrate, and phosphate. The crosslinking solution is injected after the first polymer-thickened solution injection, frequently after and before interspacing brine slugs, followed by injection of further polymer solution, which sequence can be repeated. U.S. Pat. No. 4,018,186 (Gall et al, Apr. 19, 1977), describes similar materials further with employment of controlled pH.

However, many of the materials have been deficient in hard brines (brines containing calcium and/or magnesium ions) in regard to providing a high level of effectiveness on a large scale, avoiding undue sedimentation and strata plugging, inadequate formation of gel, and the like.

A problem with bacteria also has become increasingly apparent in oil field work. Bacteria in the available feedstock surface water and in the deep subterranean structures, particularly sulfate reducing bacteria, do exist and thrive under what had seemed very adverse conditions. Sulfate reducing and other bacteria encountered in subterranean strata have become increasingly troublesome because of the production of hydrogen sulfide which causes corrosion, "sours" the oil in place and causes the precipitation of insoluble compounds such as iron sulfide which can cause the undesirable plugging of pores in the formation.

Needed have been treatments with materials which are effective as crosslinking agents and also possess bactericidal properties.

Heretofore, of the sequestered cationic materials employed in gelling polymers, aluminum citrate solutions have been the crosslinking agents of preference for economy and availability. However, a real problem has persisted in that to make up the aluminum citrate solutions fresh water must be used. Since tremendous volumes of injection solutions are involved in flood work, providing large quantities of fresh water of injection quality at the well sites has indeed been a serious problem in many locations.

Needed are effective crosslinking agents, which can be used in hard brine solutions, and at the same time possess biocidal properties particularly toward sulfate reducing bacteria.

BRIEF DESCRIPTION OF THE INVENTION

We have discovered gelable compositions suitable for injection into subterranean formations and methods for applying to at least one wellbore compositions which comprise water, a water-thickening amount of a polymer capable of gelling in the presence of a polyvalent metal crosslinking agent of biocidal properties, such as chromium propionate, and which are useful in high brine solutions. Thus, we have discovered gelable compositions possessing important biocidal properties.

Our compositions and processes have the advantages of being aqueous compositions which can be made up in available-at-the-well-site hard brine waters without the need for supplying fresh water, and the crosslinking agent itself is biocidal. This provides bacterial control in the solution of the crosslinking agent itself, assists in providing control of bacteria in the injection lines through which the biocidal solution flows, thus assisting in minimizing corrosion and maintaining protection in metal conduits. Further, it exhibits bactericidal properties in the deep strata, controlling the population of sulfate reducing bacteria, which otherwise provide undesirable metabolic products such as $H_2S$ in-situ which can cause precipitation of iron sulfide and lead to plugging in locations where such is undesirable, sometimes interrupting or disrupting or destroying the effectiveness of floods for recovering hydrocarbon reserves.

It is an object of our invention to provide both near well and indepth permeability contrast correction compositions and methods of plugging more permeable strata in subterranean formations. It is an object of our invention to provide methods for treating an underground formation for improved recovery of hydrocarbon values. It is a further object of our invention to provide crosslinking agents which are bactericidal in properties to assist in bacteria control in the available feedstock surface water and connate water in underground strata in conjunction with the gelable polymer compositions.

Other aspects, objects, and the various advantages of this invention will become apparent upon reading the specification and the appended claims.

DETAILED DESCRIPTION OF THE INVENTION

Surprisingly, we have found that certain anions of sequestering (retarding) capabilities, particularly such as propionate, are bactericidal. This is surprising, indeed, since the closely related homologue acetate is not bactericidal.

In accordance with our invention, we provide high brine-tolerant biocidal injection compositions. We further provide methods which employ the compositions, e.g. by sequential injection of a water-thickening amount of a water-soluble or water-dispersible polymeric viscosifier, brine injection, injection of the biocidal sequestered polyvalent metal cation solution of defined characteristics, preferably followed by a further brine injection, and/or preferably by a further injection of a water-soluble water-dispersible polymeric viscosifier.

CROSSLINKING AGENTS

The crosslinking agents are solutions of multivalent (polyvalent) metal cations which are effective in type and concentration to gel the selected polymer when within the gelation pH range. Such polyvalent metal ions preferably are one or more of $Al^{3+}$, $Ti^{4+}$, $Zn^{2+}$, $Sn^{4+}$, $Zr^{4+}$, and $Cr^{3+}$. Presently preferred are $Al^{3+}$ and $Cr^{3+}$, though $Cr^{3+}$ is presently much more preferred in high salinity hard brines.

Presently preferred is chromium(III). The preferred chromium (III) or other polyvalent metal cations are employed in the form of complexes with an effective sequestering or chelating amount of one or more chelating or sequestering anions of biocidal character. The biocidal chelating or sequestering component retards the onset and rate of gelation of the polymer, and as well provides the surprising and highly important biocidal property. Chromium is the preferred cation in high salinity brines including hard brine. High salinity brine contains on the order of at least about 100,000 ppm total dissolved solids. Thus, the combination of the particular chelating or sequestering agent with biocidal character in conjunction with the preferred chromium(III) cation confers high brine tolerance as well as biocidal character.

While propionate presently is a most preferred, and adipate is considered a preferred biocidal anion, further suitable for use in our invention are other types of biocidal anions of chelating and sequestering character. Various bactericidal materials include:

A. Substantially water-soluble carboxylic acids of three to five carbons and the corresponding water-soluble carboxylate salts, preferably propionate, and to a lesser extent butyrate because of its decreasing water-solubility.

B. Halogenated and/or nitro-substituted monocarboxylic acids of two to five carbon atoms and the corresponding water-soluble carboxylate salts, such as 2,2-dichloropropionic acid, 2,2-dibromobutyric acid, trifluoroacetic acid, tribromoacetic acid, trichloroacetic acid, 2,3-dibromopropionic acid, 2,2-dichlorovaleric acid, 3-nitropropionic acid, triiodoacetic acid, 3(2,2,2-trichloroethoxy)propionic acid, 4-nitro-2-chlorobutyric acid, 2-bromo-2-nitropropionic acid, 2-nitroacetic acid, and the like, alone or in admixture.

C. Hydroxylated, halogenated, and/or nitro-substituted phenyl group-containing carboxylic acids of 8 to 11 total carbon atoms and the corresponding water-soluble salts such as 2,4-dihydroxyphenyl acetic acid, 2,4-dichlorophenyl acetic acid, 3(2',4'-dibromophenoxy)propionic acid, 3(3',5'-dinitrophenoxy)propionic acid, 3-phenyl-2,3-dibromopropionic acid, 3,5-dinitrosalicylic acid, 3(3'-bromo-4'-nitrophenyl)propionic acid, 3(3',4'-dihydroxyphenyl)propionic acid, and the like, alone or in admixture, and D. Adipic acid and water-soluble adipate salts.

The desired solution of chromium(III) or other polyvalent metal cation with the sequestering or chelating agent of bactericidal properties selected from the materials as described above can be prepared in various manners.

Preparation of Chromium Solution

For example, chromium or other selected metal powder can be slurried with the acid form of the chosen anion in suitable proportions, sometimes with heating and/or with small amounts of aqueous hydrochloric acid to assist in initiating the reaction, until a desired solution is obtained. In the case of chromium(III), particularly chromium propionate, clear deep green solutions are obtained.

Sufficient retarding/sequestering anion should be present to completely associate with the chromium or other polyvalent metal cation employed. Ratios of anion:chromium or other polyvalent metal cation for a stable solution are readily determinable.

Any convenient method of preparing the chromium propionate or other polyvalent metal cation salt of bactericidal properties can be employed. For example, suitable inorganic salts can be admixed with the selected chelating/sequestering salt or acid form in suitable molar proportions.

A solution of polyvalent metal ion can be prepared from a suitable water-soluble salt or compound of the metal, such as the chloride or the like, by admixing the metal salt or compound with sufficient amounts of water to make up a desired or convenient stock concentration. Fresh water may be helpful for solubility characteristics of some salts as is known.

The sequestering agent usually is supplied or available as the sodium salt, or in some cases as the free acid. A stock solution is made up in water to a convenient concentration, such as about 1 to 5 weight percent of sequestering agent.

The polyvalent metal salt solution and the sequestering agent solution then can be admixed in suitable proportion to result in the sequestered polyvalent metal ion solution. The amount of chelating or sequestering anion employed presently is considered to be an amount preferably sufficient to substantially associate with the metal ions present in the solution. The pH of the injection solution can be adjusted as desired to assist in gelling, depending on the polymer, as is known.

Generally, the molar ratio of sequestering agent chromium or other polyvalent metal cation varies over the broad range of about 1:2 to 8:1, preferably about 2:1 to 4:1, most preferably about 2.5:1 to 3.5:1, but should be gauged such as to achieve a clean solution substantially clear without precipitate in each case. For example, with chromium salts, clear dark green colored solutions are desired.

In the case of propionate, and the preferred chromium polyvalent metal, a minimum of about 4 moles of propionate per mole of chromium, more preferably about 8 moles of propionate are considered desirable. It is contemplated that minor proportions of non-biocidal carboxylic acids such as acetic acid can be used in combination, e.g., with propionic acid to improve the economics of the overall operations without significantly diminishing the biocidal effectiveness of the chromium propionate system.

Polymers

Polymers suitable for use in this invention are those capable of gelling in the presence of polyvalent metal ion crosslinking agents. Polymers suitable for use in this invention, i.e., those capable of gelling in the presence of crosslinking agents within a gelation pH range, include biopolysaccharides, cellulose ethers, and acrylamide-based polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC).

Suitable biopolysaccharides are disclosed in U.S. Pat. No. 4,068,714 (herein incorporated by reference). Particularly preferred is polysaccharide B-1459 which is a biopolysaccharide produced by the action of *Xanthomonas campestris* bacteria. This biopolysaccharide is commercially available in various grades under the trademark Kelzan ® (Kelco Company, Los Angeles, Calif.).

Suitable acrylamide-based polymers are disclosed in U.S. Pat. No. 3,749,172 (herein incorporated by reference). Particularly preferred are the so-called partially hydrolyzed polyacrylamides possessing pendant carboxylate groups through which crosslinking can take place. Thermally stable polymers of acrylamide, such as poly(N-vinyl-2-pyrrolidone-co-acrylamide), poly(sodium-2-acrylamido-2-methyl-1-propanesulfonate-co-acrylamide-co-N-vinyl-2-pyrrolidone), and poly(sodium-2-acrylamido-2-methyl-1-propanesulfonate-co-acrylamide), are particularly preferred for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and the like.

Other miscellaneous polymers suitable for use in the present invention include partially hydrolyzed polyacrylonitrile, polystyrene sulfonate, lignosulfonates, methylolated polyacrylamides, and the like.

Presently preferred are the acrylamide based polymers, particularly the polyacrylamides and the partially hydrolyzed polyacrylamides.

The concentration or water-thickening amount of the water-soluble/dispersible polymer in the aqueous solution/dispersion can range widely and be as suitable and convenient for the various polymers, and for the degree of gelation needed for particular strata. Generally, the concentration of polymer in its aqueous solution/dispersion is made up to a convenient strength of about 100 to 20,000 ppm, preferably about 200 to 5,000 ppm.

Any suitable procedures for preparing the aqueous admixtures of the crosslinkable polymer can be used. Some of the polymers may require particular mixing conditions, such as slow addition of finely powdered polymer into the vortex of stirred water, alcohol prewetting, protection from air (oxygen), preparation of stock solutions from fresh rather than salt water, or the like, as is known for such polymers.

Preflush (Optional)

Prior to employment of the gelable compositions, the strata can be subjected to a conditioning preflush step.

The optional preflush employs aqueous solution with a lower level of hardness and/or total dissolved solids (tds) than that of the stratum connate water, of preferably containing substantially no hardness cations though it may be saline. The purpose of the preflush is to alter the salinity of the connate water by flushing the formation, generally with about one to three times the pore volume of the zone to be treated.

Since it is known that enhanced oil recovery chemicals such as surfactants and polymeric viscosifiers are adsorbed and/or precipitated to a greater extent in the presence of electrolytes and hardness cations in particular, the preflush alleviates this potential problem by sweeping out a certain fraction of such electrolytes. A typical NaCl preflush brine contains, e.g., on the order of about 0.2 to 2 weight percent total dissolved solids.

Compositions for Injections

The amount of crosslinking agent used depends largely on the amounts of polymer in the injected polymer solution. Lesser amounts of polymer, e.g., require lesser amounts of crosslinking agent. Further, it has been found that for a given concentration of polymer that increasing the amount of crosslinking agent generally substantially increases the rate of gelation. Of course, as soon as the injected polyvalent metal cation contacts the previously injected gelable polymer, gelation can begin. Rate and extent of gelation depend on proportion of each, and pH as is known which should be in a gelation pH range. Although a molar ratio can be estimated, generally the molar ratio of polyvalent metal cations to crosslinkable side groups on the polymeric viscosifier will vary with polymer molecular weight, polymer concentration and salinity. The concentration of polyvalent metal cations in the injected slug varies over the broad range of 25 ppm to 5,000 ppm, preferably over the range of 100 ppm to 2,000 ppm.

The total quantity of in situ gelable treating composition employed, e.g., in a near well treatment, can be expressed in terms of the pore volume of the area to be treated. For example, if a region (one or more stratum or portion thereof) to be treated is taking upwards of 80 volume % of the volume of injected fluid, a packer can be set to direct the treating composition into this zone. The quantity of treating composition can vary widely, depending on the effects desired, but generally from about 100% to 120% of the pore volume of the zone to be treated with the upper limit being governed merely by the practical limitations of pumping expense and chemical costs. For indepth treatment, the volume of the thief zones can be estimated by the use of tracers. From these results, the suitable amounts of polymer and crosslinking agent can be determined.

In the sequential treatment involving the injection of polymer-brine-crosslinking agent-brine-polymer the volumes of the respective brine slugs should be sufficient to prevent face plugging by delaying the mixing of crosslinking agent and polymer. Less than a suitable volume of brine slug, thus, can result in face plugging whereas greater than a suitable volume of brine slug can result in less effective treatment due to poor contacting of polymer and crosslinking agent.

A representative treatment sequence is given below.
1. A pre-flush with brine (optional).
2. Injection of a determined volume of polymer solution/dispersion.
3. Injection of a further brine volume to push the polymer on out into the (presently) more permeable strata.
4. Injection of the chromium(III) propionate solution (or other bactericidal chromium solution).
5. Injection of another brine volume to push the gel-triggering chromium propionate solution on into the (more permeable) strata to there initiate gelation and create a plug.
6. Injected floodwater is diverted into what formerly was less permeable but now is the more (relatively) permeable, and hydrocarbon-rich strata.

Aqueous Drive Fluid

The aqueous drive generally follows the permeability contrast correction process of our invention. The aqueous drive employs available field brines and/or fresh water if the latter is obtainable.

The aqueous drive, since it follows the gelation treatment, is diverted to the (formerly) relatively less permeable oil-rich zones since the permeability contrast correction process slows or substantially prevents the flow of aqueous drive fluid through the (originally) more permeable but oil-poor zones (so-called thief zones). A successful permeability contrast correction operation generally is signaled at the production well by a lowering of the water/oil ratio in the produced fluid.

Subsequent to the permeability contrast correction, the water/oil ratio may gradually increase again after prolonged injection of the drive water. A gelation retreatment of the formation can be carried out, if desired.

It is contemplated that the permeability contrast correction could also be followed by other enhanced oil recovery operations such as surfactantflooding and the like as well as the aforementioned aqueous drive.

The gel-plugging can be substantially reduced or eliminated following the gelation plugging at any time convenient thereafter by injecting an agent such as sodium hypochlorite which is recognized in the art for its effectiveness in degrading polymeric viscosifiers such as polyacrylamides.

EXAMPLES

Examples provided are intended to assist one skilled in the art to a further understanding of our invention. Particular materials employed should be considered as exemplary and not limitative. The examples are a part of our disclosure. The specification including text, examples, data, and claims, should be viewed as a whole in considering the reasonable and proper scope of our invention.

EXAMPLE I

This example describes the preparation of chromium(III) propionate from chromium metal and propionic acid with aqueous hydrochloric acid.

Chromium metal powder (2.06 g, 40 mmoles) was slurried with propionic acid (7 mL, 6.9 g, 94 mmoles) and water (1 mL, 1 g, 55.5 mmoles) in a 100 mL beaker. A small magnetic stir bar was placed in the beaker and the reaction mixture was warmed to 40°–50° C. on a stirrer hot plate as 1 mL of 1M aqueous hydrochloric acid was added to the stirred mixture. The reaction started immediately after the HCl addition as evidenced by the development of a green color in the reaction mixture. The reaction mass was stirred and heated at 40°–50° C. for 2–3 hours before allowing the reaction mixture to stand fourteen hours at ambient temperature.

The reaction mixture was re-warmed to 40°–50° C. and the supernatant blue-green colored solution was decanted into another 100 mL beaker. The remaining chromium powder was contacted with an additional 4 mL (50 mmoles) propionic acid, 1 mL of water, and 2 drops of 1M aqueous hydrochloric acid. The further reaction was allowed to continue for several hours before the second solution was combined with the above separated blue-green supernatant. An additional 2 mL (25 mmoles) propionic acid was added to this combined solution and the resulting mixture was digested at 50°–70° C. for a period of two hours. During the digestion period, distilled water was added portionwise to maintain total volume and the blue-green colored solution became a dark green colored mixture. After cooling to ambient temperature, sufficient distilled water was added to bring the final volume to 50 mL. This stock solution contained 0.8 mmole Cr per mL (4.16 wt % Cr; 41,600 ppm Cr).

Portions of this stock solution were diluted to provide, respectively, test solutions containing 1000 ppm Cr(III), 500 ppm Cr(III) and 250 ppm Cr(III) for use in laboratory core runs. For example, 24 mL of the above stock solution diluted to 1000 mL provided a liter of test solution containing 1000 ppm chromium. Similarly, 12 mL and 6 mL of the stock solution diluted, respectively, to 1000 mL provided test solutions containing 500 ppm chromium and 250 ppm chromium, respectively.

EXAMPLE II

This example describes runs which demonstrate the capacity of chromium(III) propionate (prepared in Example I), to crosslink polyacrylamide to establish high residual resistance factors in Berea sandstone cores.

The cores were cast in epoxy and equipped with five pressure taps located at the entry end of the core and located at 1", 2.5", 5" and 5.5" away from the entry end of the core. The cores were 6" in length and the pressure taps were numbered nonconsecutively from the core entry as 1, 2, 4, 3 and 5. Pressure taps 1, 2 and 3 were oriented perpendicularly to the fluid flow through the core whereas pressure taps designated as 4 and 5 were oriented (on opposite sides of the cores) in a plane making a dihedral angle of 120° with the plane of pressure taps 2 and 3. With respect to the distal end of the core, pressure tap 5 was located ½" from the end of the core; pressure tap 3 was located 1" from the end of the core; pressure tap 4 was located 3½" from the end of the core; pressure tap 2 was located 5" from the end of the core; and pressure tap 1 (at the entry of the core) was located 6" from the end of the core.

The cores were evacuated, saturated with brine under vacuum and finally saturated under 75 psi of back pressure. The cores were then preflushed with at least one pore volume of brine and initial permeability to brine was calculated. During the lab runs, pressure readings were monitored at the pressure taps with pressure transducers.

The core treatment consisted of the sequential injection of 2, 0.1, 0.4 to 0.5, 0.2 and 1 to 1.5 pore volumes of polymer solution, brine solution, chromium propionate solution, brine solution and polymer solution, respectively. The frontal advance rate of the injected fluids ranged from 2 to 10 ft/day. The polymer solution concentration was 500 ppm polyacrylamide in the designated brine. The three different core runs were carried out, respectively, with brine solutions containing 1000 ppm, 500 ppm and 250 ppm Cr. The brine used in the core runs was prepared by dissolving 50.8 g NaCl in sufficient water to give one liter of brine solution (20000 ppm Na+) (approximately 5 wt % NaCl).

Two sets of residual resistance factors were calculated for each of the chromium(III) propionate test solutions. These calculations were based on the pressure readings monitored by the pressure transducers. The first set of values is based on pressure differences between the pressure taps and reflects the effectiveness of the treatment on that part of the core located between the designated pressure taps. The second set of values is based on the pressure difference between a designated pressure tap and the distal or exit end of the core. The residual resistance factor (RRF) indicates the extent of the brine's mobility reduction through the core after the treatment, e.g., a RRF value of 10 indicates that brine mobility through the core or a portion of the core was reduced 10-fold by the sequential injection of polymer solution, brine solution, chromium(III) propionate solution, brine solution, polymer solution. The residual resistance factors (RRF) are summarized below in Tables I and II:

TABLE I

First Set of RRF (Residual Resistance Factor) Values

| Core No. | Core Permeability (Millidarcies) | Cr(III) ppm | $RRF^a$ 1,2 | $RRF^b$ 2,4 | $RRF^c$ 4,3 | $RRF^d$ 2,3 | $RRF^e$ 4,5 |
|---|---|---|---|---|---|---|---|
| 1 | 949 | 1000 | (160)* | NM# | NM# | (55.1)* | 89.4 |
| 2 | 978 | 500 | 27.7 | 20.8 | 23.4 | 20.8 | 22.9 |
| 3 | 678 | 250 | 37.1 | 16.7 | 11.8 | 13.9 | NM# |

$^a$RRF 1,2 represents the RRF value calculated from monitored pressure readings taken at pressure taps 1 (core entry) and 2 (1" from tap 1). The treatment zone considered was the first inch of the core.
$^b$RRF 2,4 represents the RRF value calculated from monitored pressure readings taken at pressure taps 2 and 4 located, respectively, 1" from core entry and 2.5" from core entry (a treatment zone of 1.5").
$^c$RRF 4,3 represents the RRF value calculated from monitored pressure readings taken at pressure taps 4 and 3 located, respectively, 2.5" from core entry and 4" from core entry (a treatment zone of 1.5").
$^d$RRF 2,3 represents the RRF value calculated from monitored pressure readings taken at pressure taps 2 and 3 located, respectively, 1" from core entry and 4" from core entry (a treatment zone of 3").
$^e$RRF 4,5 represents the RRF value calculated from monitored pressure readings taken at pressure taps 4 and 5 located, respectively, 2.5" from core entry and 5.5" from core entry (a treatment zone of 3").
*These values represent approximations because massive gels formed near the pressure taps and prevented good contact between the pressure sensor and the flowing fluid.
NM# represents "Not Measured".

Referring to the results in Table I, it is evident that the treatment becomes more effective (increasing RRF values) as the concentration of chromium in the test solution is increased from 250 ppm to 500 ppm to 1000 ppm.

TABLE II

Second Set of RRF (Residual Resistance Factors) Values

| Core No. | Core Permeability (Millidarcies) | Cr(III) ppm | $RRF^a$ 1,E | $RRF^b$ 2,E | $RRF^c$ 3,E | $RRF^d$ 4,E | $RRF^e$ 5,E |
|---|---|---|---|---|---|---|---|
| 1 | 949 | 1000 | 109.5 | (93.8)* | 209.8 | 143.3 | 269 |
| 2 | 978 | 500 | 165.4 | (191.3)* | 702.7 | 230.6 | 1382.5 |
| 3 | 678 | 250 | 25.9 | 22.3 | 59.2 | 24.4 | NM# |

*See footnote in Table I
See footnote in Table I
$^a$RRF 1,E represents the residual resistance factor for the entire 6" length of the core.
$^b$RRF 2,E represents the RRF for the last 5" of the core.
$^c$RRF 3,E represents the RRF for the last 1" of the core.
$^d$RRF 4,E represents the RRF for the last 3.5" of the core.
$^e$RRF 5,E represents the RRF for the last 0.5" of the core.

Referring to the results in Table II, it is evident that the RRF values increase as the zones of the core are considered in passing from core entry to core exit. It is noteworthy that the core run involving the use of the aluminum citrate system described hereinbelow exhibited the reverse trend in RRF values passing through the designated zones between core entry and core exit.

A comparative core run with aluminum citrate was carried out to illustrate the superiority of the propionate sequestered chromium(III) system over the citrate sequestered aluminum(III) system. The test solution of aluminum citrate was 500 ppm Al(III) and the Al to citrate ratio was 1.75/1. The procedure was the same as used above with the chromium propionate system and the results are summarized in Tables III and IV. The footnotes of Tables I and II are pertinent, respectively, to the core zone designations used in Tables III and IV.

TABLE III

First Set of RRF Values (Aluminum Citrate System)

| Core No. | Core Permeability (Millidarcies) | Al(III) ppm | $RRF^a$ 1,2 | $RRF^b$ 2,4 | $RRF^c$ 4,3 | $RRF^d$ 2,3 |
|---|---|---|---|---|---|---|
| A | 885 | 500 | 4.3 | 2.2 | 3.8 | 3.1 |
| 2 (Table I) | 978 | 500 ($Cr^{+3}$) | 27.7 | 20.8 | 23.4 | 20.8 |

$^{a-d}$see footnotes a–d Table I.

Referring to the results of Tables I and III, in particular to the 500 ppm Cr(III) run in Table I, it is evident that the RRF values in the Cr(III) propionate treatment sequence far exceeded the corresponding RRF values in the aluminum citrate treatment sequence.

TABLE IV

| | Second Set of RRF Values (Aluminum Citrate System) | | | | | | |
|---|---|---|---|---|---|---|---|
| Core No. | Core Permeability (Millidarcies) | Al(III) ppm | RRF$^a$ 1,E | RRF$^b$ 2,E | RRF$^c$ 3,E | RRF$^d$ 4,E | RRF$^e$ 5,E |
| A | 885 | 500 | 2.9 | 3.2 | 3.5 | 3.7 | 2.33 |
| 2 (Table II) | 978 | 500 (Cr$^{+3}$) | 165.4 | (191.3)° | 702.7 | 230.6 | 1382.5 |

$^{a-e}$See footnotes a–e in Table II
°See *footnote in Table II.

Referring to the results in Table IV and Table II, in particular to the 500 ppm Cr(III) run in Table II (also entered in Table IV), it is evident that the RRF values in the Cr(III) propionate treatment sequence far exceeded the corresponding RRF values in the aluminum citrate treatment sequence. Furthermore, in the aluminum citrate system it is apparent that the RRF values decrease as the zones of the core are considered in passing from core entry to core exit whereas the reverse trend prevails in the chromium(III) propionate system.

EXAMPLE III

This example demonstrates the excellent performance of the chromium(III) propionate system (250 ppm Cr) in a hard brine. The core run was carried out in the same manner as described in Example II above except the NaCl brine was replaced with a hard brine (synthetic South Burbank Unit brine) containing, respectively, 23000 ppm, 5000 ppm, 1050 ppm and 960 ppm sodium, calcium, barium and magnesium. The RRF value results are summarized in Tables V and VI. The footnotes of Tables I and II are pertinent, respectively, to the core zone designations used in Tables V and VI.

tem in SBU (Synthetic South Burbank Unit) hard brine were much higher than observed in the 5 wt % NaCl brine of core run number 3 (from Table II). The RRF values remained relatively constant during the passage of 75 pore volumes of hard brine after-flush. This indicates the potential capacity of the chromium(III) propionate system to provide a long-lived permeability contrast correction even in the presence of hard brine.

The permeability contrast correction obtained with the aluminum citrate system was not nearly so long-lived, e.g., during the passage of 75 pore volumes of hard brine after-flush, the RRF value was lowered by $\frac{2}{3}$ of its magnitude calculated after three pore volumes of brine after-flush. These results generally indicate the greater capacity of the chromium(III) propionate system over the aluminum citrate system for permeability contrast correction particularly in the presence of hard brines.

EXAMPLE IV

This example presents results which substantiate the biocidal activity of the chromium(III) propionate system toward sulfate reducing bacteria (SRB). These results are presented to buttress the thesis that the biocidal activity of the system is attributable to the propionate anionic sequestering group rather than to the chromium cation.

TABLE V

| | First Set of RRF Values in Hard Brine | | | | | |
|---|---|---|---|---|---|---|
| Core No. | Core Permeability (Millidarcies) | Cr(III) ppm | RRF$^a$ 1,2 | RRF$^c$ 4,3 | RRF$^d$ 2,3 | RRF$^e$ 4,5 |
| B (Hard Brine) | 704 | 250 | 10.2 | 31.6 | 15.4 | 33.2 |
| 3°° (From Table I) (NaCl Brine) | 678 | 250 | 37.1 | 11.8 | 13.9 | NM# |

°Synthetic South Burbank Unit hard brine was used in core B.
°°5.0 wt % NaCl brine was used in core number 3.
NM represents "Not Measured".
$^{a,c-e}$See footnotes a, c–e in Table I.

Referring to the results in Table V it is evident that the RRF values in the hard brine were generally higher than those in the soft NaCl brine.

The test employed consisted of mixing 1 mL of the test material with 10 mL of Arkansas-Burbank water containing sulfate anion and 1 mL of sulfate reducing

TABLE VI

| | Second Set of RRF Values in Hard Brine* | | | | | | |
|---|---|---|---|---|---|---|---|
| Core No. | Core Permeability (Millidarcies) | Cr(III) ppm | RRF$^a$ 1,E | RRF$^b$ 2,E | RRF$^c$ 3,E | RRF$^d$ 4,E | RRF$^e$ 5,E |
| B (Hard Brine) | 704 | 250 | 164.7 | 197.7 | 740.5 | 301.4 | 1266.4 |
| 3°° (From Table II) (NaCl Brine) | 678 | 250 | 25.9 | 22.3 | 59.2 | 24.4 | NM# |

°See footnote in Table V.
°°See footnote in Table V.
NM See footnote in Table V.
$^{a-e}$See footnotes a–e in Table II.

Referring to the results in Table VI, it is evident that the RRF values of the chromium(III) propionate sysbacteria (SRB) culture in a serum bottle. After 24 hours, 0.1 mL of the resulting mixture was placed in a SRB growth medium containing an iron nail in a bottle. The bottle was placed in an incubator at 120° F. for either 28 days or until the appearance of black ferrous sulfide which ever occurred first. The appearance of FeS is an indication of SRB growth; if no FeS was observed then the test material was designated as biocidal. In such testing, chromium(III) propionate, chromium(III) adipate and chromium(III) trifluroacetate showed biocidal activity.

A similar test was carried out on chromium(III) acetate to demonstrate that the next lower homolog was not biocidal toward SRB. Two samples were tested for biocidal activity toward sulfate reducing bacteria (SRB). One sample was commercially available chromium(III) acetate from Fisher Scientific Co. and the other sample was prepared in the laboratory by the reaction of chromium metal and acetic acid in a manner analogous to the procedure used in Example I for making chromium propionate from chromium metal and propionic acid. The biocidal tests were carried out at 250 ppm, 500 ppm and 750 ppm chromium(III) acetate. Since all of the tests showed growth of SRB within 24 hours, it was concluded that chromium(III) acetate is not biocidal toward sulfate reducing bacteria.

Another control run was carried out with chromium(III) citrate to support the thesis that Cr(III) cation is not the biocidal entity in chromium(III) propionate. The citrate anion is a well-known metabolite for microorganisms. Since concentrations of 250 ppm, 500 ppm and 750 ppm chromium(III) citrate did not inhibit SRB growth, it was concluded that the Cr(III) cation is not biocidal toward sulfate reducing bacteria.

On the basis of the above test results, it appears that chromium(III) propionate is biocidal toward SRB whereas the next lower homolog, i.e., chromium(III) acetate, is not biocidal. It appears that the SRB biocidal activity is contributed by the propionate sequestering group rather than the Cr(III) cation.

The disclosure, including data, has illustrated the value and effectiveness of our invention. The examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

We claim:

1. A composition comprising a gelable aqueous solution of at least one crosslinkable water soluble polymer and at least one biocidal sequestered polyvalent metal cation wherein said biocidal sequestered polyvalent metal cation is prepared by contacting a polyvalent metal in zero valent oxidation state with at least one biocidal sequestering agent in the presence of aqueous hydrochloric acid wherein said polyvalent metal cation is selected from the group consisting of $Al^{+3}$, $Ti^{+4}$, $Zn^{+2}$, $Sn^{+4}$, $Cr^{+3}$, $Zr^{+4}$ and mixtures; wherein said water soluble polymer is selected from the group consisting of biopolysaccharides, cellulose ethers, acrylamide-based polymers, partially hydrolyzed polyacrylamides, polystyrene sulfonates, lignosulfonates, methylolated polyacrylamides and mixtures; and wherein said biocidal sequestering agent is selected from the group consisting of:
   (a) propionic acid, butyric acid and valeric acid and the corresponding water soluble carboxylate salts;
   (b) 2,2-dichloropropionic acid; 2,2-dibromopropionic acid; trifluoroacetic acid; tribromoacetic acid; trichloroacetic acid; 2,2-dibromobutyric acid; 2,2-dichlorovaleric acid; 3-nitropropionic acid; triiodoacetic acid; 3(2,2,2-trichloroethoxy)propionic acid; 4-nitro-2-chlorobutyric acid; 2-bromo-2-nitropropionic acid; and 2-nitroacetic acid and the corresponding water soluble carboxylate salts; and
   (c) 2,4-dihydroxyphenyl acetic acid; 2,4-dichlorophenyl acetic acid; 3(2',4'-dibromophenoxy) propionic acid; 3(3', 5'-dinitrophenoxy) propionic acid; 3-phenyl-2,3-dibromopropionic acid; 3,5-dinitrosalicylic acid; 3(3'-bromo-4'-nitrophenyl)propionic acid; 3(3', 4'-dihydroxyphenyl) propionic acid and the corresponding water soluble carboxylate salts and
   (d) adipic acid and water soluble adipate salts.

2. A composition according to claim 1 suitable for treating an underground formation wherein said crosslinkable water soluble polymer comprises acrylamide-based polymers and partially hydrolyzed polyacrylamides and said biocidal sequestered polyvalent metal cation comprises chromium(III) propionate.

* * * * *